April 4, 1944.　　　R. A. B. ALLEN, JR　　　2,345,561
INTERNAL COMBUSTION ENGINE
Original Filed July 22, 1940　　4 Sheets-Sheet 1

INVENTOR
Roy A. B. Allen Jr.
BY
Dyke & Schainer
ATTORNEYS

April 4, 1944.    R. A. B. ALLEN, JR    2,345,561
INTERNAL COMBUSTION ENGINE
Original Filed July 22, 1940    4 Sheets-Sheet 3
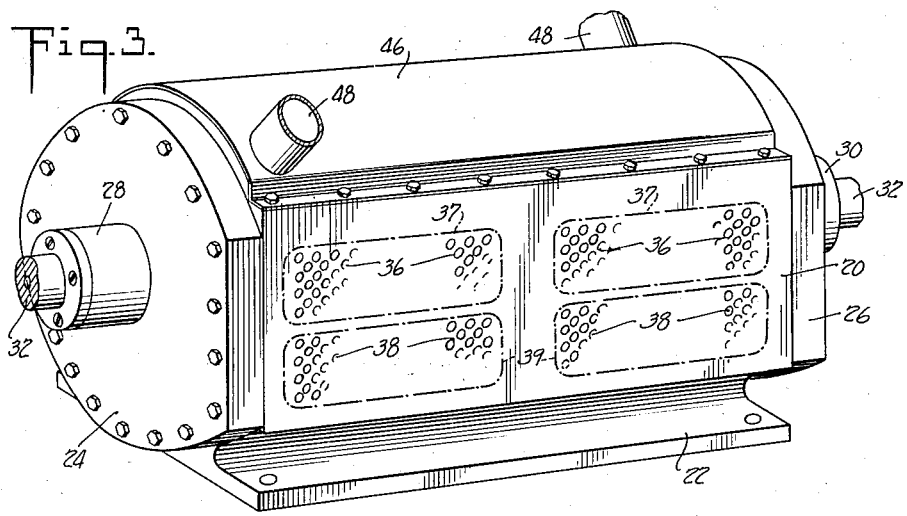
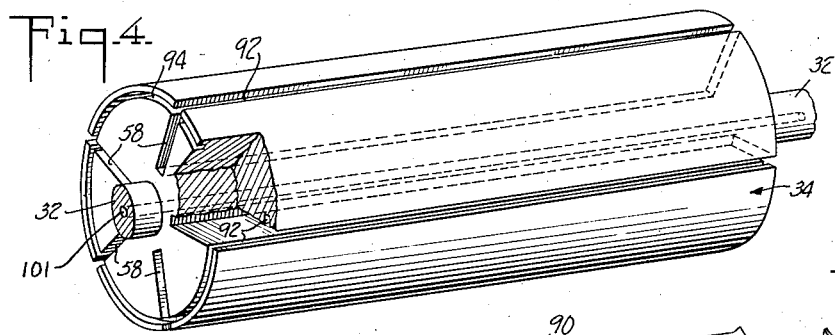
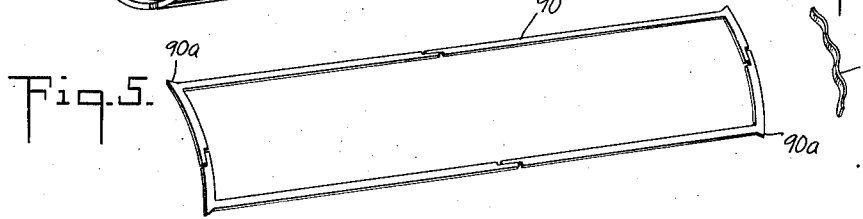
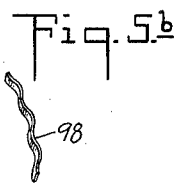
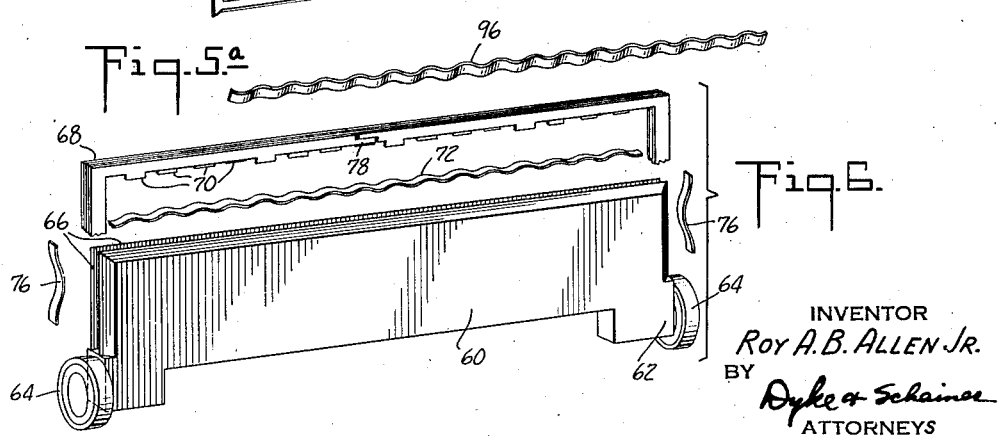
INVENTOR
Roy A. B. Allen Jr.
BY
Dyke & Schainer
ATTORNEYS

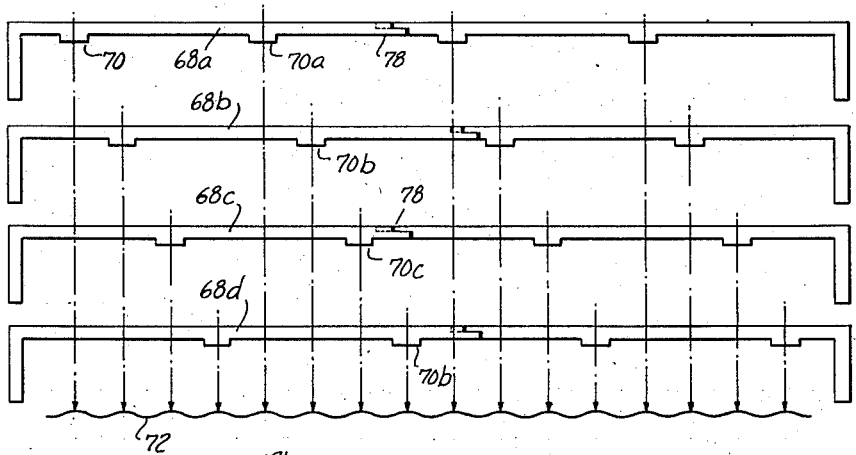
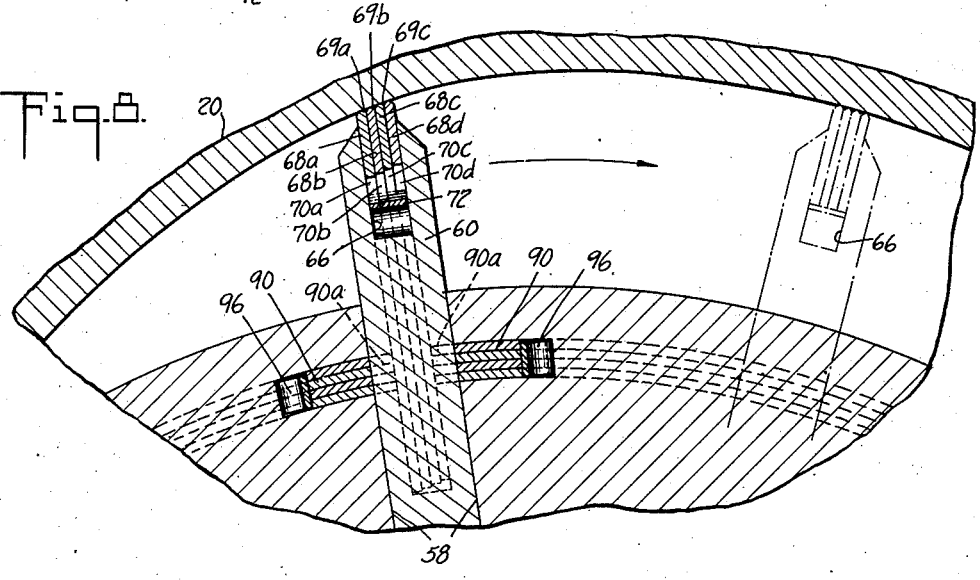
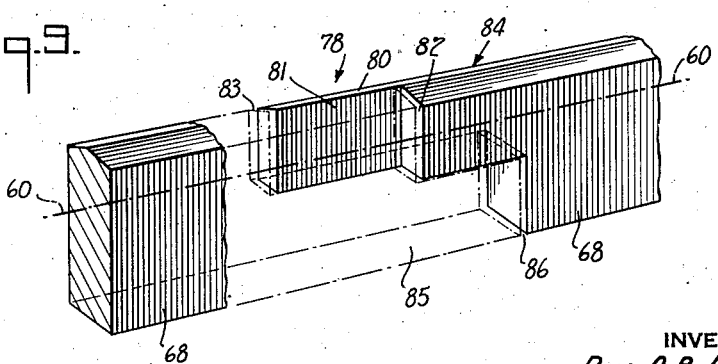

Patented Apr. 4, 1944

2,345,561

UNITED STATES PATENT OFFICE 2,345,561

INTERNAL COMBUSTION ENGINE

Roy Albert Bryan Allen, Jr., Dallas, Tex.

Substitute for abandoned application Serial No. 346,708, July 22, 1940. This application November 12, 1941, Serial No. 418,739

4 Claims. (Cl. 123—16)

This application is a substitute for previously filed abandoned application Serial No. 346,708, dated July 22, 1940.

My invention relates to rotary internal combustion engines. This type of engine is capable of many advantages over reciprocating internal combustion engines, notably saving of lost power involved in the starting and stopping of reciprocating parts, more even application of power, and more flexible design possibilities for the power-applying expansion of the burning charge.

Of the rotary engines, the outstandingly advantageous type is that wherein a rotor carrying generally radial abutments rotates within a casing having a different center or a different contour, with the chambers formed between rotor, casing, abutments, and casing and plates. Here, however, the problem of effective sealing of the chambers for high pressures is a difficult one and is aggravated when a non-cylindrical contour of the casing is adopted in order to achieve the advantages of operation wherein each chamber goes through a complete cycle with each rotation of the rotor.

It is a prime object of the present invention to devise a rotary internal combustion engine having an improved sealing system whereby with effective sealing of the chambers within which compression and expansion takes place the advantages of the described type of engine may be made fully practical.

Further objects include the provision of a high pressure sealing system in which a minimum of wear will be experienced while at the same time the chambers are effectively sealed for very high pressures, and the provision of sealing means wherein a plurality of any desired number of separate sealing elements bear against the casing wall in such relation that the forcing in of any one or more of the elements forces out some other one or more of the sealing elements whereby the strongest sealing is effected when and where most needed and effective sealing against irregular surfaces may be accomplished.

* Further objects will become apparent during the course of the detailed description of a preferred embodiment of my invention, in which Fig. 1 is a transverse central vertical section of the casing and of portion a of the rotor, with portion b of the rotor completely cut away, revealing the far end plate of the casing, and with remaining portion c of the rotor not sectioned but shown in full end view;

Fig. 3 is a perspective view of the outside of the engine;

Fig. 4 is a perspective view of the rotor before insertion of the blades and sealing elements, with a small sector broken away to show the slots and grooves for the reception of the blades and sealing elements;

Fig. 5 is a perspective view of one of the sealing frames;

Fig. 5a is a perspective view of an end spring for the sealing frames;

Fig. 5b is a perspective view of a side spring for the sealing frames;

Fig. 6 is an exploded view of one of the radial abutment blades and its associated sealing parts;

Fig. 7 is a front view of the blade sealing elements and associated spring, showing their relation;

Fig. 8 is an enlarged detail corresponding to the upper part of Fig. 1 and showing a blade in different positions; and Fig. 9 is an enlarged detail in perspective of the lapping portions of the sealing elements.

The mode of operation of my engine is that the rotor 34 turns in the direction of the arrows, drawing a mixed fuel charge into chamber I, compressing it in chamber II, firing it in chamber III, whereupon it expands in chamber IV, applying power to turn the rotor, and is driven out of chamber V as exhaust.

Figure 1:
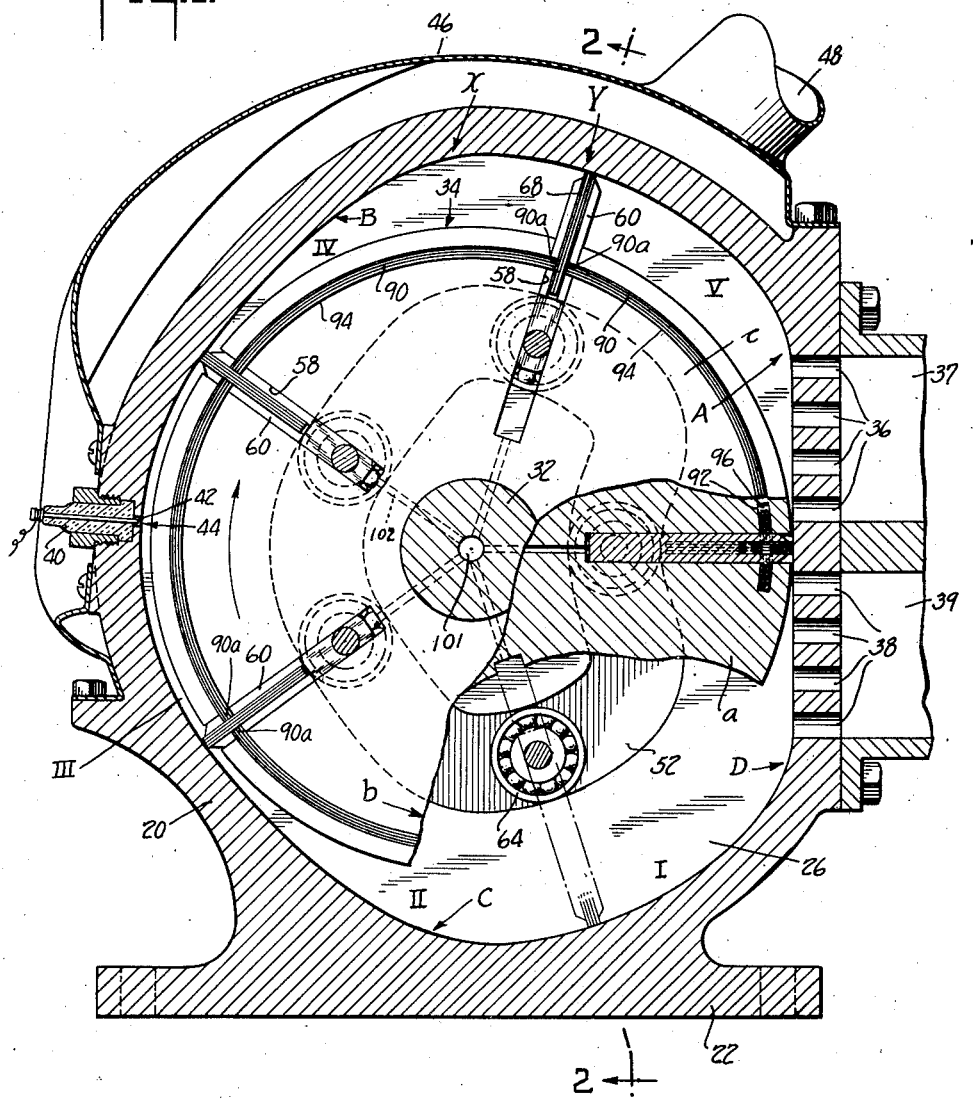

The engine has a casing 20 of shape somewhat like a cylinder, provided with base 22. End plates 24, 26 are bolted to the casing and provide bearings 28, 30 for shaft 32. Cylindrical rotor 34 is coaxially mounted on shaft 32 and is positioned within the casing 20. The inner surface of casing 20 is cylindrical and coaxial with rotor 34 for a segment thereof shown at the left in Fig. 1. With a gradual change of curvature, the casing is enlarged toward the upper right and lower right as seen in Fig. 1 and is reduced at the right hand side as seen in Fig. 1 to provide a generally flat segment which at its point of tangency to the rotor provides just working clearance between itself and the rotor. Exhaust ports 36 extend through the casing above this point of tangency, communicating with exhaust pipe 37, and intake ports 38 extend through the casing below this point of tangency, communicating with fuel mixture pipe 39. Opposite the point of tangency, where the casing sector is cylindrical, a spark plug 40 is screwed into the casing with a contact point 42 extending into a small firing chamber 44 which is formed in the casing just back from its cylindrical sector inner surface and open to the space within the casing. A water jacket 46 having water flow pipe connections 48 is secured to the upper and left portions of the casing by bolts or the like. In the end plates 24, 26 cam races 50, 52 are provided. Preferably these cam races are provided with steel liners 54, 56.

The rotor 34 in the embodiment illustrated is generally solid but in case saving of weight or further cooling provision is desired, it is not necessary that it be solid throughout.

A desired number of radial slots 58 are formed in the rotor extending for its entire length longitudinally and extending radially from points spaced from the center of the rotor all the way out to the surface of the rotor. In the embodiment illustrated there are five of these slots 58 equally spaced around the rotor. Blades 60 slide within the slots 58 for the purpose of forming radial abutments to make enclosed chambers between the rotor, casing and end walls. Suitable lubrication means is provided, as by central bore 101 at the axis of the rotor and communicating radial bores 102 to the blade slots 58, whereby reciprocating movement of the blades give a pump circulation to the oil. Blades 60 are provided with extensions 62 at the ends of their lower edges. At these extensions 62 ball bearings 64 are formed which fit within the cam races 50, 52 with working clearance so that the ball bearings can roll on either the inner or outer surfaces of the cam races with a movement of only perhaps a few thousandths of an inch in changing their bearings against the inner surfaces of the cams to the outer or vice versa. The cam races 50, 52 are formed in calculated shape and measurement so that as the cylindrical rotor rotates in a non-cylindrical casing, the blades 60 will slide in and out in the grooves 58 so that their outer ends, measured at the centers of the thickness of the blades, will be slightly spaced at a substantially unvarying distance from the non-cylindrical inner surface of the casing throughout the entire rotation of the rotor.

Figs. 6 and 8 illustrate the formation of the blade 60, beveled down at its top and end edges, and with a more or less U-shaped groove 66 formed in its outer and end faces. The walls of this groove 66 are parallel, and within the groove fit a plurality of sealing elements 68. This group of sealing elements is slightly thicker than the diameter of the small firing chamber 44, to prevent the gases from passing back over the sealing elements as they move past the firing chamber. It is desirable that more than two of these sealing elements be provided within the groove of each blade 60, and in the embodiment illustrated four such sealing elements 68a, 68b, 68c and 68d are provided. The purpose of these sealing elements is to provide a tight fit between the top and ends of each blade and the casing and its end plates. The sealing elements 68 in groove 66 are pressed outwardly by a curled leaf spring 72 of the crest and trough variety, which is fitted in the bottom of the groove 66 under the sealing elements 68. When the engine is assembled the parts are so proportioned that spring 72 is placed under a moderate compression which imparts an outward force to the group of sealing elements 68 as a whole, which force for the group of sealing elements as a whole is constant throughout the entire rotation of the rotor, since the cam races 50, 52 guide the blades at a uniform distance from the casing. This initial spring pressure of the sealing elements against the casing is fairly moderate and involves little resistance or wear.

The fit of these sealing elements against the inner surface of the casing is particularly important inasmuch as the casing in the preferred embodiment illustrated is of an irregular non-cylindrical shape where a single wide fixed sealing element would lose contact across most of its face where the curvature of the casing changes. For the purpose of achieving a constant flexible fit, the group of separate sealing elements is used, all the sealing elements 68 being provided with feet 70, four such feet being shown for each sealing element, and the feet 70 being staggered on the various sealing elements.

Figure 2:
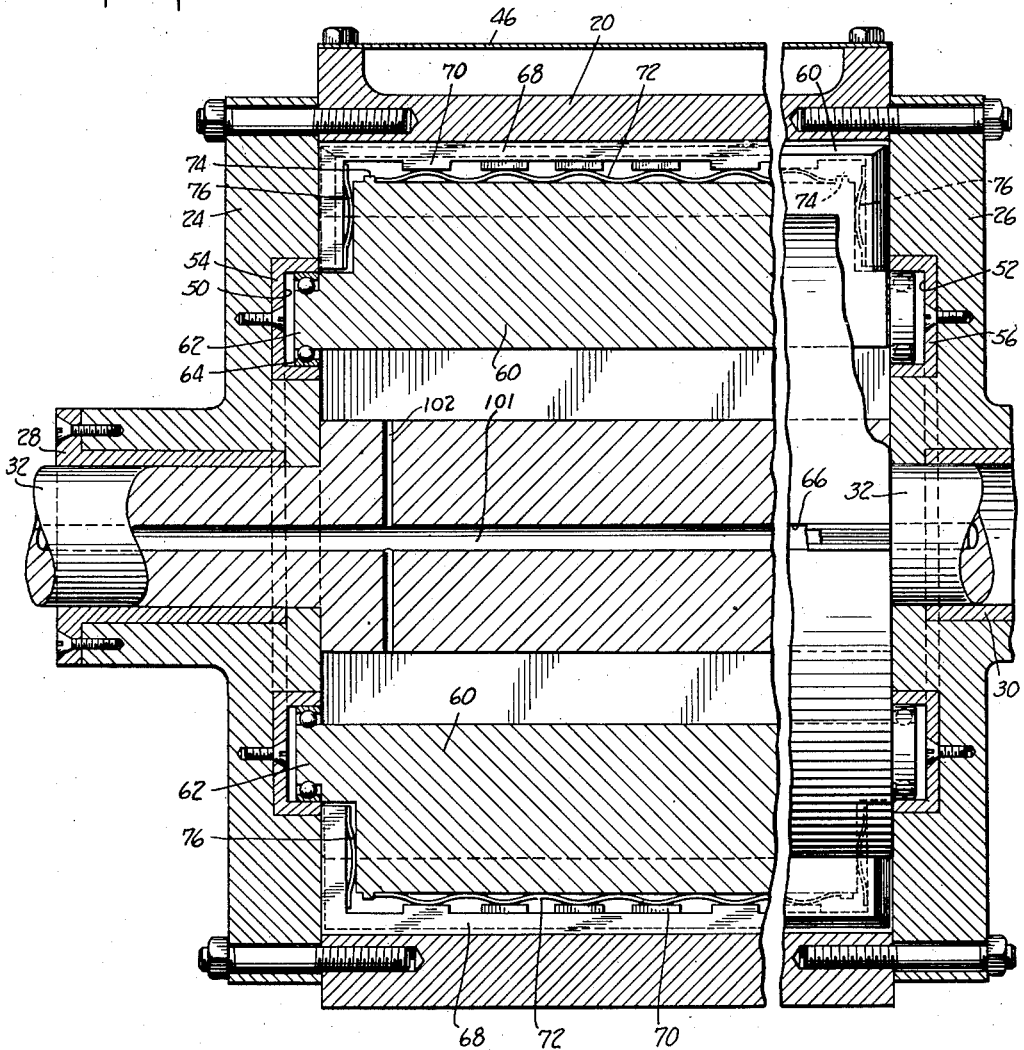
Fig. 2 is a longitudinal section of the casing taken substantially on the line 2—2 of Fig. 1, an intermediate portion of its length being broken away, and with the right end of the rotor shown in full front view.

Shoulders 74 are provided substantially at the ends of the straight top portion of the groove 66 and the ends of the spring 72 abut against these shoulders. The feet 70 of successive sealing elements 68 rest on successive crests of the spring 72 as shown in Fig. 2, and as illustrated diagrammatically by the dotted arrows in Fig. 7. As a result of this arrangement, it will be seen that as the rotor sweeps the blade over a non-cylindrical portion of the surface of the casing, while the blade itself is held by the cams at a substantially unvarying clearance from the casing surface, the sealing elements will have to adapt themselves to the slanting contour of the casing surface by those to one side being pushed in somewhat and those to the other side being pushed out somewhat. This is accomplished in a positive, compensated manner by the arrangement of the staggered feet and the curled leaf spring. With reference particularly to Fig. 8, if for example the contour of the casing forces the sealing elements 68a and 68b inwardly, the pressure of their feet 70a and 70b against the crests of the spring 72 on which these feet rest will exert pressure upon the spring. Since this pressure cannot be relieved by endwise expansion of the spring, due to the shoulders 74, the pressure will seek relief in forcing upwardly other crests of the spring 72. This creates an additional pressure through feet 70c and 70d urging the remaining sealing elements 68c and 68d outwardly. This pressure will force all of the sealing elements to move in or out in a compensated manner whereby their average extension remains substantially the same but one or more will be pushed out beyond this average whenever one or more are pushed in below this average. Thus the outer edges of the sealing elements 68 will adapt themselves for all to remain in contact with the surface of the casing regardless of the shape of the casing at that particular point and whether it is slanting in to a smaller radius, as for example at regions A or C in Fig. 1, or slanting out as in regions B and D of Fig. 1.

In addition to the initial compression of spring 72 which keeps the sealing elements normally all in contact with the casing surface even through its changes in curvature, there is a further and different sealing action which comes into play in the regions of high gas pressure, as will appear from the following.

It will be appreciated that as the several sealing elements 68 sweep around the arcuate surface of the casing 20, each sealing element cannot have more than substantial line contact throughout the entire rotation because the casing surface is non-cylindrical. If the top face of the sealing element is square across with right angle corners (transversely of its length), then the line contact will be at the leading edge in those portions of the casing where its radius is decreasing and will be at the following edge at those portions of the casing where its radius is increasing. I shape the outer edge of my sealing elements as a central ridge from which the face slopes downwardly to both sides as best seen in Figs. 8 and 9. The angles of the two slopes are at least as great as the angle of departure from a cylindrical shape on the part of the casing surface. This not only forms a constant and unvarying line of contact along the center of each sealing element top face, but also forms small empty groove-like chambers 69a, 69b and 69c between each pair of sealing elements and running their length. These serve to slow up the leakage of gases over the tops of the sealing elements, since gases which find any minute clearance to pass over the top edge of the first sealing element must continue to pass long enough to fill the first groove chamber 69a and bring it up to pressure before they can exert pressure to find passage over the top edge of the next sealing element.

In the meantime, when the gases have passed over the top edge of the first element and filled the groove space behind it, they will then exert downward pressure upon the top edge of this first sealing element 68a which will tend to force this sealing element downwardly farther into the grooved blade. Upon this occurrence, the feet 70a of sealing element 68a and the spring 72 will act to give a greater outward pressure to the remaining sealing elements 68b, 68c and 68d, which outward pressure will be distributed among them in accordance with the path of least resistance but will act most strongly on the next sealing element 68b because the spring crests under its feet are immediately adjacent those under the feet of the inwardly pressed elements 68a. Thus the passage of the gases over the first sealing element produces a stronger seal on the part of the remaining sealing elements. When the gases thereafter find their way past the second sealing element, the process will be repeated, giving an even greater sealing pressure upon the remaining sealing elements 68c and 68d. Likewise passage of the gases over the third sealing element will give a further increased outward pressure for tighter sealing on the part of the last sealing element 68d. It will be seen that the farther the gases pass over the successive sealing elements, the greater pressure they concentrate on the remaining sealing elements to prevent their further leakage.

If such strong sealing pressures, forcing the sealing elements outwardly against the casing surface, were provided so as to be in effect all the time all the way around the casing, as for example by providing very strong independent springs forcing out the several sealing elements, then the frictional resistance to rotation would be extremely great and the resultant wear would make the engine short-lived.

By my present arrangement the pressures are automatically provided the greatest when they are needed the most, so that effective sealing against very high pressures is provided while at other times when the pressure in the chambers is not so great there is a reduced pressure between the sealing elements and the casing. It will be observed that with my arrangement a practically unlimited number of separate compensating sealing elements may be provided in each group in this same relation with each other, so extremely high gas pressures can be effectively sealed in, particularly as the groove spaces 69 provide a time lag in the successive passages, and the time interval during which any chamber is under compression is short. I have found that it is a requisite for successful operation to have several of these sealing elements in each group, and that as small a number as two is not satisfactory for most purposes.

The gas pressure chambers must be sealed from each other between the blades 60 and the end walls 24, 26 as well as between the blades and the casing. The sealing problem here is not so difficult because the end walls are perfectly flat and do not normally require any in-and-out travel of the sealing elements. To accomplish this sealing, I make the sealing elements 68 in a more or less U-shape corresponding to the groove 66 so that their perpendicular ends extend down between the ends of the blade 60 and end walls 24, 26. Short curled leaf springs 76 within the downwardly extending end portions of the groove 66, seated under the end portions of the sealing elements 68 under compression, act to force the sealing elements outwardly endwise against the end walls with sufficient force to provide an effective seal.

To allow for the action of springs 76 and any slight endwise travel of the sealing elements which might be required from inaccuracy of machining or wear, the sealing elements are split as shown at 78. The shape of the overlapping halves of these sealing elements 68 is illustrated in detail in Fig. 9. The splits are staggered as seen in Fig. 7 and are so formed as not to allow gases under pressure to travel past them.

Less than half the depth of any sealing element projects from the blade 60 at any time, the average position of the top edge of blade 60 being shown by the dotted line 60 in Fig. 9. The upper halves of the right and left portions of the sealing element are overlapped, by means of half thickness projections 80, 81 of corresponding size, which lie against each other along the center vertical lengthwise plane of the sealing element, leaving staggered vertical joint splits 82, 83.

Below these side-lapping projections the halves of the sealing elements are lapped in a top-and-bottom relation. The upper projecting part 84 of the right half lies flat upon the lower projecting part 85 of the left half, and the vertical joint 86 where the end of the lower projecting part meets the solid body of the right half is staggered with respect to the vertical joints 82, 83 in the upper half.

In connection with these splits 82, 83, it is highly desirable to have the contact of the edge of the sealing element against the casing wall come at the center of the sealing element where the line of contact will not be interrupted by the vertical split openings 82, 83. By having the ridge along the top edge of the sealing element coincide with the vertical plane of the overlapping upper portions where the splits 82, 83 occur, I keep a line contact of the sealing element all the way along its length against the casing surface regardless of any endwise spreading of the sealing element and opening of the overlapping splits.

The formation of the double overlap prevents passage of the gases all the way down in the grooves 82, 83 formed by the overlapping split, since such passage would allow the gases to pass under the sealing elements 68 and so into the next gas chamber.

With the double overlap arrangement shown, any gases which enter the top of the open joint 82 or 83 can pass down to its bottom but cannot pass the rest of the way to the open space under the sealing elements. The blades or the adjacent sealing elements close the sides of these joints, while the top-and-bottom overlapping ends fit tight and flat against each other and close the bottoms.

The action of the sealing elements 68 above described seals against passage of gases over the tops or past the ends of blade 60. It is necessary also to seal against passage of the gases down under the blades 60 through the slots 58. It is also necessary to provide against passage of the gases from one chamber to the next between the ends of the rotor 34 and the casing end walls 24, 26. Both of these sealing provisions are accomplished together by means of frames 90. In order to reduce friction and wear, the portions of these sealing frames 90 acting between the ends or rotor 34 and end plates 24, 26 are arcuate so that collectively they form circles concentric with the axis of rotor 34. Grooves 92 are formed in the sides of slots 58 in the rotor, running for their entire length and being parallel to the outer surface of the rotor, while arcuate grooves 94 are formed in both ends of the rotor concentric with its axis and communicating directly with grooves 92. The sealing frames 90 are generally rectangular but with arcuate ends. They are formed of four parts each having a partial length in arcuate groove 94, with overlapping splits where these various L-shaped portions join to make the entire generally rectangular frame. As many sets of the above-described four portions may be provided as desired, with the overlapping splits of the various sets staggered. A single frame is shown in Fig. 5, while Figs. 1 and 8 show multiple frames of four duplicate frames set together. At the four corners of the sealing frame 90 angular projections 90a are formed which correspond to the bevels at the ends of the blades 60. Curled leaf springs 96 seat in the grooves 92 under the sides of the frames 90, pressing them against the sides of the blades 60. Short curled leaf springs 98 seat in arcuate sections of the grooves 94 under the ends of frames 90, pressing them against the end plates 24, 26. Thus when the blades 60, sealing frames 90, and sealing elements 68 are assembled in the rotor 34, a substantially flush pressure-tight composite sealing ring is provided at each end of rotor 34 to bear against end plates 24 and 26.

It is not generally necessary to provide the staggered foot arrangement of the sealing elements 68 with the portions of this sealing frame 90 inasmuch as the members which bear against them and move relative to them are substantially planar and no appreciable movement in and out of the portions of sealing frame 82 will be experienced.

While I have illustrated and described a preferred embodiment of my invention, it will be understood that extensive variations and modifications thereof are possible within the scope of my invention, whereby I wish it to be understood that my invention is not limited to the embodiment shown but only to the scope of the appended claims.

I claim:

1. An internal combustion engine having a generally cylindrical rotor journaled within a casing, the surface of said casing being at varying distances from said rotor about its periphery, blades sliding in radial slots in said rotor, cam means constraining said blades to a uniform clearance of their outer edges at their center-of-thickness planes from the casing surface, slots in the outer edges of said blades, a plurality of sealing elements slidable within said slots and forced into close contact with the casing surface, and compensating pressure means translating inward movement of any sealing element to outward pressure upon the others, said compensating pressure means comprising a trough-and-crest curled ribbon spring in the blade groove under the sealing elements, means constraining same against endwise expansion, and staggered feet on the several sealing elements resting on successive crests of the spring.

2. An internal combustion engine having a generally cylindrical rotor journaled within a casing, the surface of said casing being at varying distances from said rotor about its periphery, blades sliding in radial slots in said rotor, cam means constraining said blades to a uniform clearance of their outer edges at their center-of-thickness planes from the casing surface, slots in the outer edges of said blades, a plurality of sealing elements slidable within said slots and forced into close contact with the casing surface, and a spring acting on all the sealing elements to force same into close contact with the casing surface, and to translate inward movement of any one sealing element into outward movement of the other sealing elements.

3. Device of claim 2 in which the spring is of the trough-and-crest curled ribbon variety, and each of the sealing elements bears against a plurality of spaced apart crests of the spring.

4. Device of claim 1, in which said compensating pressure means comprises a trough-and-crest curled ribbon spring in the blade groove under the sealing elements, means constraining the same against endwise movement comprising shoulders extending upwardly from the floor of the groove near the ends thereof, and staggered feet on each of the several sealing elements resting on successive spaced crests of the spring.

ROY ALBERT BRYAN ALLEN, Jr.